Sept. 17, 1940.  C. L. EKSERGIAN  2,215,420
ANNULAR BRAKE STRUCTURE
Filed March 17, 1939  2 Sheets-Sheet 2
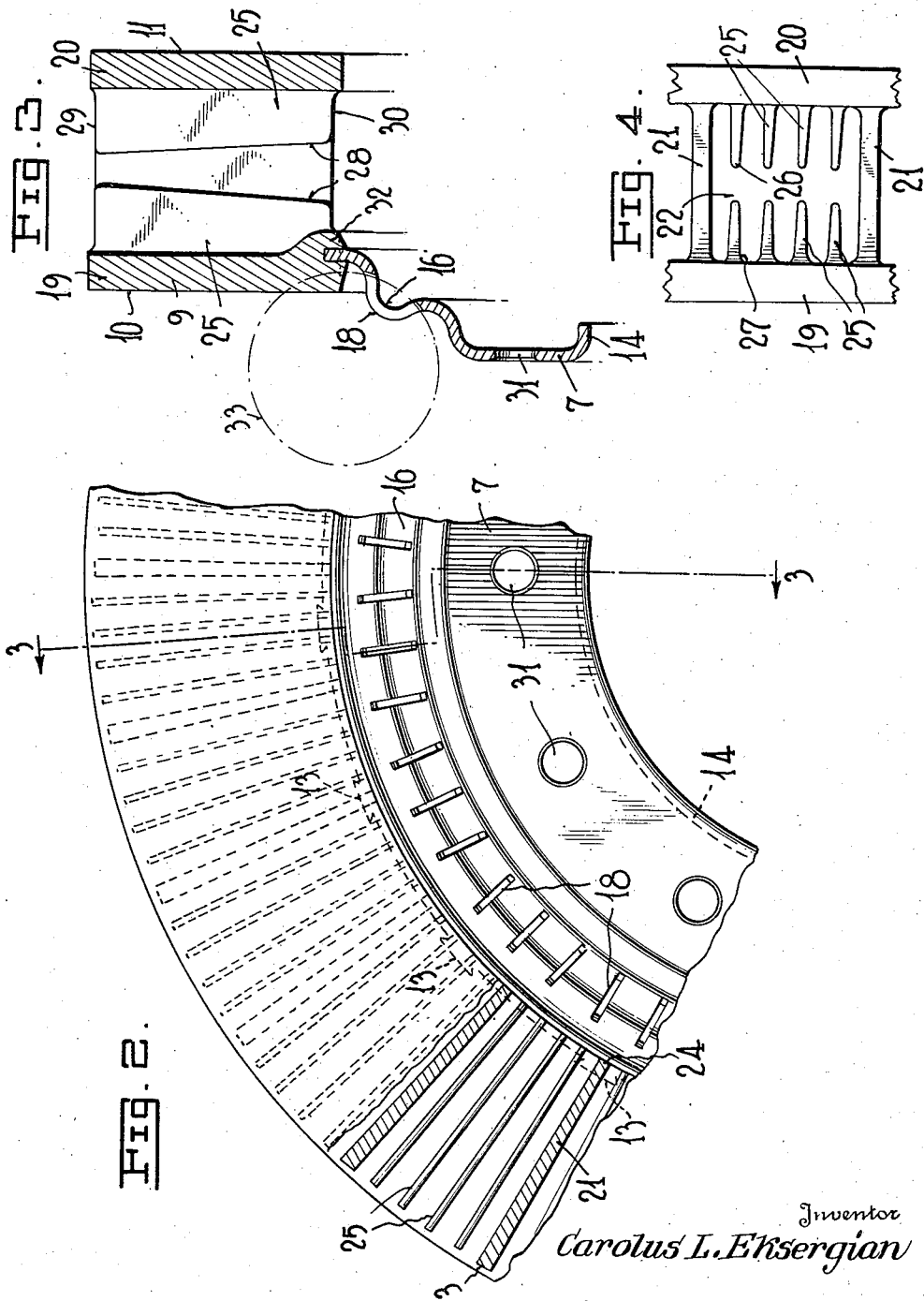
Inventor
Carolus L. Eksergian
By John P. Barbor
Attorney Patented Sept. 17, 1940

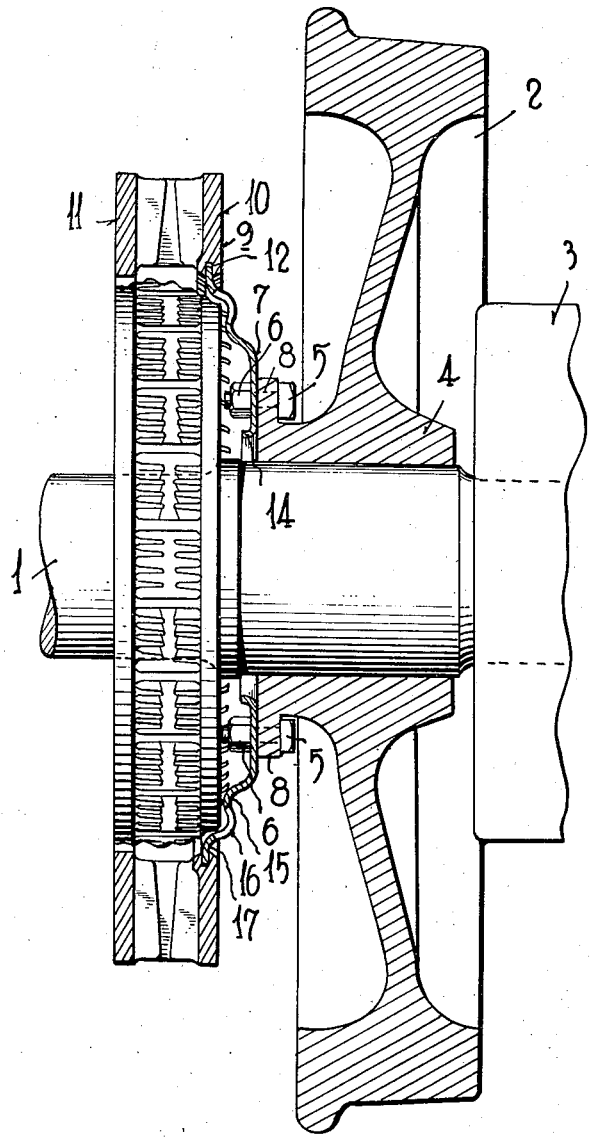

2,215,420

UNITED STATES PATENT OFFICE 2,215,420

ANNULAR BRAKE STRUCTURE

Carolus L. Eksergian, Detroit, Mich., assignor to Budd Wheel Company, Philadelphia, Pa., a corporation of Pennsylvania Application March 17, 1939, Serial No. 262,358

7 Claims. (Cl. 188—218)

The present invention relates to brakes.

More specifically, it relates to a further development of the type of brake disclosed in the present inventor's copending case Serial No. 250,275, filed January 11, 1939, for Brakes, now Patent No. 2,208,525, dated July 16, 1940. In said prior case the brake ring is made up by embedding sheet metal vanes in castings and furthermore by securing cooling means, also fabricated of sheet metal, to the brake ring in various ways. While such structure of the copending case is entirely satisfactory in all operating and mechanical respects, it now has been found possible to secure a material cheapening in manufacture by making the brake ring as a one-piece casting, thereby avoiding the necessity of securing cooling vanes and the like to the casting and also decreasing the size of the casting by so doing, whereby both space and metal may be economized.

While in the present case the sheet metal flange, which is secured to the wheel hub or axle at its inner end and to the casting at its outer end, is retained broadly speaking in the same general way as in the prior case, said flange has also been improved in its details, namely, by providing circumferential corrugations therein to increase its flexibility and prevent breakage and furthermore by providing substantially radial openings or slots therein which serve the double purpose of still further increasing the flexibility and of providing passages for cooling air.

Additional differences and advantages of the present invention over the prior invention will be clearly understood from the following specification, particularly in connection with the accompanying drawings, wherein:

Fig. 1 is a partly sectional elevation of a vehicle wheel and brake ring, mounted on an axle which is shown partly broken away, Fg. 2 is a front elevation of a fragment of the brake ring and the supporting flange, as seen from the right in Fig. 1, the wheel and axle being omitted, and certain of the radial braces being shown in section, Fig. 3 is a section through the structure illustrated in Fig. 2, the section being made on the several parallel planes indicated by the broken line 3—3 of Fig. 2, looking in the direction of the arrows, and Fig. 4 is an elevation of a fragment of the brake ring as seen from the outside, looking radially toward the axle.

Similar parts in all the figures are indicated by corresponding reference characters.

Referring first to Fig. 1, the vehicle wheel 2 having a hub 4 is shown mounted upon an axle 1 which may be journaled at each end in a box 3 or the like.

It will be understood that the wheel 2 may be of any desired kind but preferably a flange 8 is provided on the hub 4 and has suitable holes therein to receive a number of bolts 5 which may pass through the holes 31 in the brake ring supporting flange 7 and secure the same to the hub flange 8 by means of nuts 6 or the like, although it should be clearly understood that if preferred the flange 7 may be secured to the axle in any other way, for example it may be secured by means entirely independent of the vehicle wheel. Furthermore, in special cases where for any reason the wheel 2 is loose on the axle, the brake-holding flange 7 will of course be secured directly to the wheel and not to the axle, as is well known in motor vehicle brakes for instance.

The brake ring, designated as a whole by reference character 9, is here illustrated in the form of a double ring having two parallel brake shoe receiving surfaces 10 and 11 on its opposite outer annular faces. The flange 7 may be secured to the brake ring by casting said brake ring 9 directly upon the peripheral portion 12 of the flange 7, the portion of the ring 9 adjacent said peripheral part of the flange being preferably slightly enlarged for additional security, as best shown at 32 (Fig. 3).

In order to prevent the flange 7 from becoming loose in the brake ring, dovetailed tongues 13, shown in Fig. 2, are preferably provided on the flange, these tongues becoming embedded firmly in the brake ring 9 during the casting operation so that it is impossible to cause the flange 7 to slip with relation to the ring 9.

The flange 7 may have a flanged or bent-up inner end as shown at 14 to increase its strength and stiffness and, furthermore, the flange 7 is preferably provided with circumferential corrugations as shown at 15, 16, and 17. It will be understood that while a certain number of such circumferential corrugations has been disclosed specifically, it is not necessary to adhere to this exact number or configuration of the corrugations but any reasonable changes may be made therein without materially affecting the desired purpose of somewhat increasing the flexibility of the flange so as to permit a slight degree of yield of the brake ring 9 in various directions by flexure of the flange 7.

Substantially radial slots 18 may be provided in the corrugation 16, said slots preferably being spaced practically uniformly along said corrugation and being sufficiently numerous and extensive to provide a satisfactory extent of opening for the passage of cooling air without unduly sacrificing the mechanical strength of the flange.

It will be noted that these slots are preferably placed in the outermost corrugation, that is, as close as practicable to the brake ring 9 so that the cooling air flowing through said slots may impinge directly upon the annular brake surface 10.

These slots are best cut in the flange 7 before said flange is secured to the brake ring 9 and preferably they are made by a rotating multiple or gang cutter such as a triple abrasive wheel or a triple milling tool or circular saw. Assuming that a triple cutter is employed, it will be seen that the slots will be cut in groups of three, so that while the central one of each group may be strictly radial, the two outer slots of the group, which are of course parallel to the central slot, thus will deviate slightly from the true radial direction. In this way it is possible, for example, to cut sixty substantially radial slots in only twenty separate cutting operations, instead of the sixty operations with a single cutter which would be required to make all the slots strictly radial. This results in a material saving of time. The end view of the gang cutter 33 is indicated as a dot-and-dash circle in Fig. 3.

Referring now more particularly to Figs. 3 and 4, it will be noted that the brake ring comprises in effect two annular members 19 and 20 which are connected firmly to one another at suitable intervals by cross braces 21 so as to produce a very rigid member. Large air spaces 22 remain between the consecutive braces 21, which braces are preferably of the cross section illustrated in Fig. 2, that is, they are substantially radial vanes which taper from a relatively thick outer end 23 to a thinner inner end 24.

Each air space 22 has a series of cooling fins 25 projecting thereinto, eight such fins being shown in Fig. 4, for example. These fins are made of such shape that they can be cast readily and so that they will have ample mechanical strength, this being accomplished by making each fin preferably with a rounded inner end as shown at 26, the fin becoming thicker as it approaches its respective end ring 19 or 20 and having a fillet 27 where it is attached to the ring, said fillet serving the double purpose of adding mechanical strength where the fin joins the ring and of providing an increased section of metal to improve the flow of heat from the ring to the fin.

Each fin moreover preferably has a tapered configuration, that is, its inner edge 28 slopes, as best shown in Fig. 3, so that the fin is considerably longer at its peripheral end 29 than at its radially inner end 30, as illustrated. By thus tapering the fins and slanting their edges in the direction indicated, the total unobstructed area of the air passage 22 is maintained substantially uniform, that is, air passing in a radially outward direction through said air passage 22 is not subjected to either compression or expansion in traversing such air passage and thereby a freer flow of air is made possible through the said passages. This facilitates the flow of cooling air and correspondingly increases the cooling effect.

It will be understood that the outer surfaces 10 and 11 which receive the annular- or annular sector-shaped brake shoes are preferably finished to a plane or, if preferred, a slightly conical or other suitable surface to cooperate properly with the brake shoes, which brake shoes themselves constitute no part of the present invention.

The operation of the mechanism above described will of course be clear from the structure. It may be summarized briefly as follows:

Suitable brake shoes are applied to the surfaces 10 and 11 so as to press against these two surfaces. This will slow down, and eventually stop, the rotation of the wheel and of course will generate heat due to the kinetic energy consumed in braking.

The whole structure, however, acts also as a centrifugal blower and produces air currents which will flow radially outward past the vanes 25 and the braces 21 so as to carry off heat therefrom. Since these vanes and braces are integral with the brake rings themselves there is a good flow of heat by conduction from the braking surfaces 10 and 11 to said braces and vanes and consequently in periods of long extended braking enough heat will be dissipated thereby to keep the brake rings from overheating and possibly burning or otherwise injuring the brake shoes or the rings themselves.

An additional flow of air will occur through the openings 18 in the brake flange and this flow will assist in cooling that brake shoe which is between the surface 10 and the wheel 2. This brake shoe is, of course, somewhat more isolated from contact with the open air than the brake shoe bearing against the surface 11 and consequently the additional cooling produced by the air currents through the slots 18 will tend to compensate for the difference and thus keep both brake shoes adequately cooled to an approximately equal, or at any rate sufficient, extent.

For an understanding of the features of novelty constituting the present invention attention is directed to the following.

What I claim is:

1. An annular rotary brake structure comprising a double-ring member having two opposite outer braking surfaces extending substantially perpendicular to the axis of the member, braces connecting said rings, said braces being arranged in substantially axial planes, and subdividing the space between the rings into a plurality of air flow passages, and a plurality of vanes extending inwardly from the rings into each of said passages between adjacent braces, said vanes and braces constituting means for conducting heat from said braking surfaces and for producing a flow of cooling air through said passages to rapidly dissipate the heat from said member through contact of the air with the extensive surface area provided by said vanes, braces and the inner surfaces of said rings.

2. An annular rotary brake structure comprising a cast double-ring member having two opposite outer braking surfaces extending substantially in planes perpendicular to the axis of the member, braces integral with and connecting said brake rings, and a perforated circumferentially corrugated mounting flange for the member, said member being cast upon the periphery of the flange, the perforations serving to allow cooling air to flow through the flange, to impinge on one of the braking surfaces.

3. An annular rotary brake structure comprising a cast double-ring member having two opposite outer braking surfaces extending substantially in planes perpendicular to the axis of the member, braces integral with and connecting said brake rings, and a mounting flange for the member, said member being cast upon the periphery of the flange, said flange having a number of substantially radially extending slots therein, to allow cooling air to flow through the flange and impinge on one of the braking surfaces.

4. An annular rotary brake structure comprising a cast double ring member having two opposite outer braking surfaces extending substantially in planes perpendicular to the axis of the member, braces integral with and connecting said brake rings, and a circumferentially corrugated, slightly yieldable mounting flange for the member, said member being cast upon the periphery of the flange, said flange having a number of substantially radially extending slots in an outer corrugation, adjacent the member, to allow cooling air to flow through the flange and impinge on one of the braking surfaces.

5. An annular rotary brake structure comprising a double-ring member having two opposite outer braking surfaces extending substantially perpendicular to the axis of the member, braces connecting said rings, said braces being arranged in substantially axial planes and subdividing the space between the rings into a plurality of air flow passages, and a plurality of vanes generally paralleling the braces and extending inwardly from the rings into each of said passages between adjacent braces, said vanes and braces constituting means for conducting heat from said braking surfaces and for producing a flow of cooling air through said passages to rapidly dissipate the heat from said member through contact of the air with the extensive surface area provided by said vanes, braces and the inner surfaces of said rings.

6. An annular brake structure according to claim 5 in which the vanes are of increasing depth radially outwardly whereby to compensate in some degree for the increase in spacing between the vanes and between the vanes and braces radially outwardly.

7. An annular rotary brake structure comprising a double-ring member having two opposite outer braking surfaces extending substantially perpendicular to the axis of the member, transverse braces spaced circumferentially of the member, interconnecting said rings and subdividing the space between the rings into a plurality of air flow passages extending generally radially, and a plurality of vanes generally paralleling the braces and extending inwardly from the rings into each of said passages between adjacent braces, said vanes and braces constituting means for conducting heat from said braking surfaces and for producing a flow of cooling air through said passages to rapidly dissipate the heat from said member through contact of the air with the extensive surface area provided by said vanes, braces and the inner surfaces of said rings.

CAROLUS L. EKSERGIAN.